United States Patent
Ohtomo et al.

(10) Patent No.: US 7,187,434 B2
(45) Date of Patent: Mar. 6, 2007

(54) SURVEYING APPARATUS

(75) Inventors: Fumio Ohtomo, Tokyo (JP); Kaoru Kumagai, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 11/146,674

(22) Filed: Jun. 7, 2005

(65) Prior Publication Data
US 2005/0275826 A1    Dec. 15, 2005

(30) Foreign Application Priority Data
Jun. 9, 2004    (JP)    ............................. 2004-171363

(51) Int. Cl.
G01C 3/08    (2006.01)
(52) U.S. Cl. .................................... 356/5.04
(58) Field of Classification Search ................ 356/5.15
See application file for complete search history.

(56) References Cited

U.S. PATENT DOCUMENTS 4,269,491 A    5/1981    Hagyuda et al.
5,307,137 A *  4/1994    Jones et al. ................ 356/4.01
2004/0233414 A1 * 11/2004 Jamieson et al. .......... 356/4.01

FOREIGN PATENT DOCUMENTS

| EP | 0 874 218 A1 | 10/1998 |
| JP | 2000-321055 A | * 11/2000 |
| JP | P2000-321055 A | 11/2000 |
| WO | WO 03/008909 A1 | 1/2003 |

* cited by examiner

*Primary Examiner*—Thomas H. Tarcza
*Assistant Examiner*—Luke Ratcliffe
(74) *Attorney, Agent, or Firm*—Chapman and Cutler LLP

(57) ABSTRACT

A surveying apparatus includes an irradiation portion provided with an objective lens, and for irradiating a ranging light toward a measured object, a ranging portion for measuring a distance per unit time more than once based on a reflection light reflected by the measured object and entered through the objective lens, a collimation optical system portion for collimating the measured object through the objective lens, the collimation optical system portion being provided with an image processing device configured to obtain a collimation image obtained through the objective lens, and a determination device to determine whether or not a moving obstacle has passed a projection optical path of the ranging light during projecting the ranging light based on an image obtained by the image processing device.

4 Claims, 2 Drawing Sheets

SURVEYING APPARATUS

BACKGROUND OF THE INVENTION

1. Field of the Invention

The present invention relates to an improvement in a surveying apparatus comprising an irradiation portion, which has an objective lens and irradiates ranging light toward a measured object, a ranging portion for measuring a distance per unit time more than once based on reflection light reflected by the measured object and entered through the objective lens, a collimation optical system portion for collimating the measured object through the objective lens, and the collimation optical system portion being provided with an image processing device for obtaining a collimation image obtained through the objective lens.

2. Related Art Statement

Conventionally, there has been known a surveying apparatus of non-prism type comprising an irradiation portion, which has an objective lens and irradiates ranging light toward a measured object, a ranging portion for measuring a distance per unit time more than once based on reflection light reflected by the measured object and entered through the objective lens, and a collimation optical system portion for collimating the measured object through the objective lens (Reference to Japanese Pant Laid Open 2000-321055, for example).

The conventional surveying apparatus comprises ranging functions of prism ranging and non-prism ranging, and includes a measure for preventing miss-measurement when the prism ranging is used.

However, in the above conventional surveying apparatus, when a moving obstacle has come across a projection optical path of ranging light while measuring the distance, the reflection light from the moving obstacle different from the original ranging object enters through the objective lens. Therefore, there may be a case that the ranging result includes an error.

SUMMARY OF THE INVENTION

The present invention has been made in view of the above problem, and an object of the present invention is to provide a surveying apparatus capable of preventing an error resulting from a moving obstacle from including in a ranging result, even thought the moving obstacle has come across a projection optical path of ranging light while using a non-prism ranging or a non-prism ranging mode.

In one embodiment of the present invention, a surveying apparatus comprises an irradiation portion provided with an objective lens, and for irradiating a ranging light toward a measured object, a ranging portion for measuring a distance per unit time more than once based on a reflection light reflected by the measured object and entered through the objective lens, a collimation optical system portion for collimating the measured object through the objective lens, the collimation optical system portion being provided with an image processing device configured to obtain a collimation image obtained through the objective lens, and a determination device configured to determine whether or not a moving obstacle has passed a projection optical path of the ranging light during projecting the ranging light based on an image obtained by the image processing device.

In the surveying apparatus of one embodiment of the present invention, the determination device conducts a warning when it is determined that the moving obstacle has come across the projection optical path.

In the surveying apparatus of one embodiment of the present invention, the determination device eliminates a ranging result of the ranging portion when it is determined that the moving obstacle has come across the projection optical path.

In the surveying apparatus of one embodiment of the present invention, an image frame in which the image processing device obtains per unit time and ranging data in which the ranging portion obtains per unit time are related, and when it is determined that the moving obstacle has come across the projection optical path, the determination device eliminates a ranging result corresponding to the image frame containing the moving obstacle within the image frame obtained by the image processing device to obtain ranging data.

In the surveying apparatus of one embodiment of the present invention, the ranging portion additionally measures ranging data for the number of eliminated ranging result.

According to one embodiment of the present invention, even though the moving obstacle has come across the projection optical path while using a non-prism ranging or non-prism ranging mode, an error resulting from the moving obstacle can be prevented from including in the ranging result.

According to one embodiment of the present invention, even though the moving obstacle has come across the projection optical path, ranging time can be reduced, and the ranging can be automatically added. Therefore, the ranging result can be obtained without deteriorating raining accuracy.

PRIORITY CLAIM

This application claims the benefit of priority to Japanese Application No. 2004-171363, filed on Jun. 9, 2004, which is hereby incorporated by reference.

DETAILED DESCRIPTION OF THE PREFERRED EMBODIMENT

Hereinafter, an embodiment of a surveying apparatus according to the present invention will be described with reference to the accompanying drawings.

Figure 1:
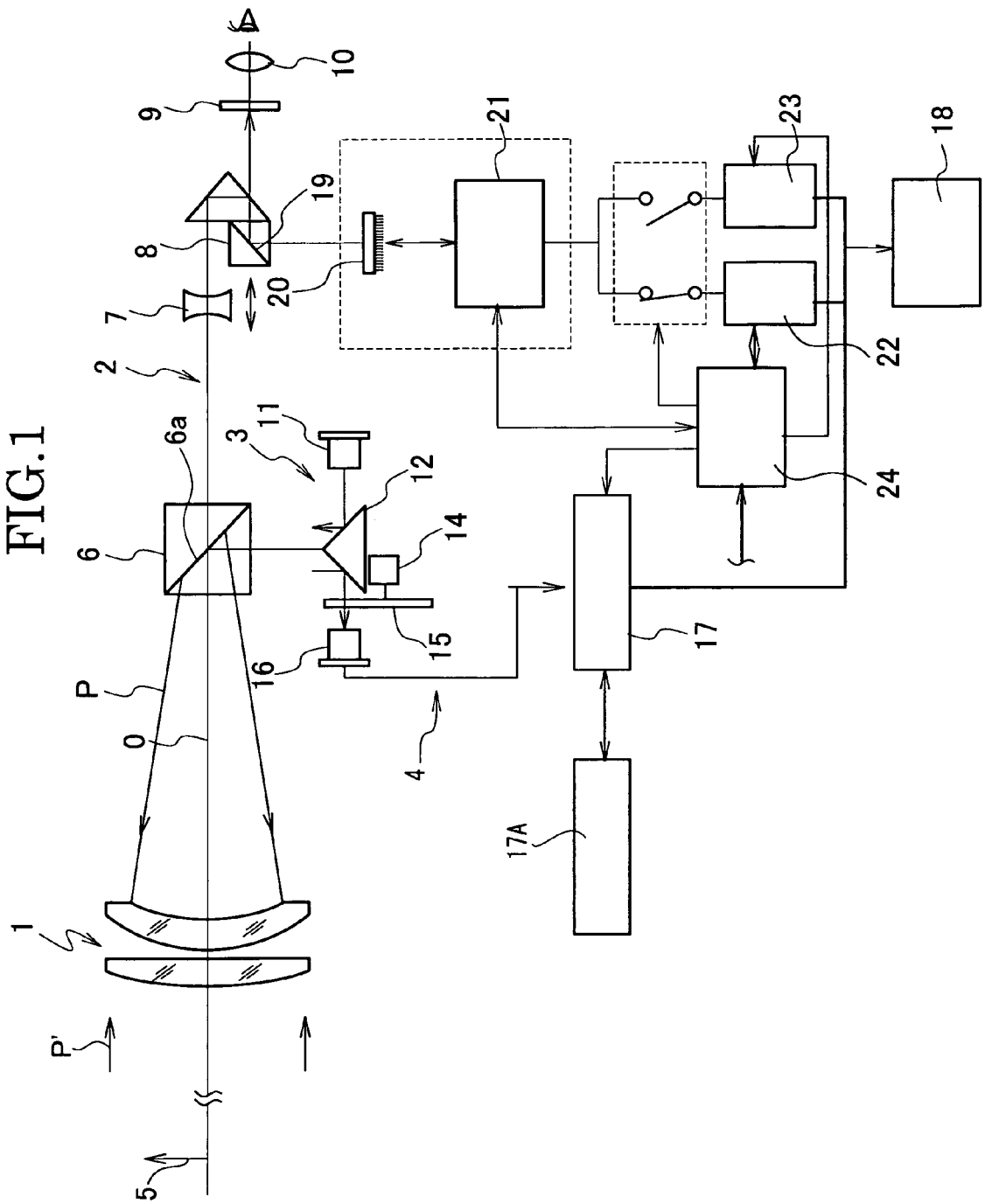
FIG. 1 is an explanation view showing an optical portion of a surveying apparatus according to the present invention.

FIG. 1 shows an optical system of a surveying apparatus according to the present invention. In FIG. 1, a reference numeral 1 denotes an objective lens, a reference numeral 2 denotes a collimation optical system portion, a reference numeral 3 denotes an irradiation optical portion, and a reference numeral 4 denotes a ranging portion.

The collimation optical system portion 2 is for collimating a measured object 5, and comprises a telescope having an objective lens 1, an optical path dividing prism 6, a focusing lens 7, a Porro prism 8, a focal point mirror 9 and an eyepiece lens 10. A reference numeral 0 denotes a collimation optical axis.

The irradiation optical portion 3 includes a laser diode 11 as a ranging light source and a triangular prism 12. A ranging light P emitted from the laser diode 11 is reflected by the triangular prism 12, the light reflected by the triangular prism 12 is reflected by the reflection surface 6a of the optical path dividing prism 6 toward the objective lens 1, and then the light reflected by the reflection surface 6a is projected to the measured object 5 through the objective lens 1.

The ranging portion 4 includes a light volume adjusting motor 14, a light volume adjusting filter 15, a light-receiving element 16 and an arithmetic control circuit 17. A reflection light P' of the ranging light P reflected by the measured object 5 is entered into the telescope through the objective lens 1, is reflected by the reflection surface 6a of the optical path dividing prism 6, the light volume of the light reflected by the reflection surface 6a is adjusted by the light volume adjusting filter 15, and is entered into the light-receiving element 16.

The light-receiving output of the light-receiving element 16 is input to the arithmetic control circuit 17. When a non-prism ranging mode is used, the arithmetic control circuit 17 measures a distance to the measured object 5 per unit time, for example 60 times per second, and temporarily stores the ranging data in a memory 17A, and outputs the average value of the ranging result toward a monitor 18. The distance from the surveying apparatus to the measured object 5 is displayed on the monitor 18.

The Porro prism 8 of the collimation optical system portion 2 includes an optical path dividing surface 19. The Porror prism 8 divides an incident light flux entered into the objective lens 1 and passed the optical path dividing prism 6 into a light flux guiding the incident light flux to the focal point mirror 9 and a light flux guiding the incident light flux toward an image sensor 20 provided in forward of the traveling direction.

The light flux traveled toward the focal point mirror 9 is imaged onto focal point mirror 9. A surveying worker can collimate a background including the measured object 5 by viewing a visualized image imaged onto the focal point mirror 9 thorough the eyepiece lens 10.

An image pickup device, for example, CCD, CMOS, etc., is used for the image sensor 20. The image sensor 20 is input to an image processing circuit 21 for processing image information. The image processing circuit 21 is connected to the monitor 18. A background image is displayed on the monitor 18 with a ranging result. The image processing circuit 21 obtains, for example, an image of 30 frames per second. In this case, a first frame buffer memory 22 and a second frame buffer memory 23 are provided between the monitor 18 and the image processing circuit 21. The frame image is alternately input to the first frame buffer memory 22 and the second frame buffer memory 23.

The first frame buffer memory 22 and the second frame buffer memory 23 are controlled to be switched by a determination device 24. The determination device 24 is made to be an operation mode at the same time that the surveying apparatus is set to the non-prism ranging mode.

The determination device 24 reads the image data of the first frame buffer memory 22 and image data of the second frame buffer memory 23, and compares the data of each pixel. More particularly, the determination device 24 determines a difference between the image data (previously obtained image data) of the first frame buffer memory 22 and the image data (currently obtained image data) of the second frame buffer memory 23. When the difference is found, the determination device 24 considers that a moving obstacle has passed the projection optical path during projecting ranging light, outputs a signal indicating the passage of the moving obstacle to the monitor 18, and displays a warning on a screen of the monitor 18.

In addition, warning sound can be generated instead of the warning display.

At the same time, the determination device 24 outputs a ranging result eliminating command toward the arithmetic control circuit 17. The arithmetic control circuit 17 eliminates all ranging data per unit time stored in the memory 17A based on the ranging result eliminating command. Next, the determination device 24 outputs a re-ranging command toward the arithmetic control circuit 17. The arithmetic control circuit 17 reactivates the laser diode 11 to conduct a re-measurement.

Figure 2:
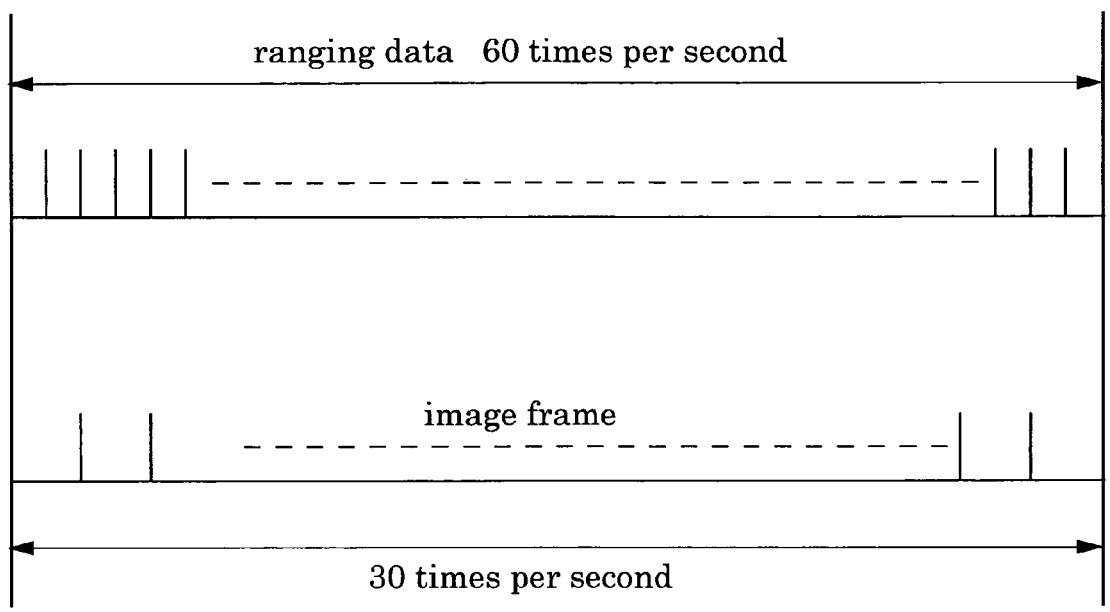
FIG. 2 is an explanation view showing a relationship between the number of obtaining image data per unit time and the number of obtaining ranging data per unit time according to the present invention.

In the above embodiment, all ranging data per unit time is eliminated. However, as shown in FIG. 2, one frame of the image data and the number of ranging can be previously related to be stored by relating the number of ranging data per unit time and the number of image frame per unit time, and by synchronizing the beginning of ranging and the obtaining of image data, for example. Accordingly, when the determination device 24 determines that a moving obstacle has come across the projector optical path, the ranging result corresponding to the image frame containing the moving obstacle within the image frames obtained by the image processing circuit 21 is eliminated from the memory 17A, and only ranging data for the number of eliminated ranging result can be additionally obtained. Therefore, the ranging result can be obtained without deteriorating a ranging accuracy when the moving obstacle has come across the projection optical path.

What is claimed is:

1. A surveying apparatus, comprising:
an irradiation portion provided with an objective lens, and for irradiating a ranging light toward a measured object;
a ranging portion for measuring a distance based on a reflection light reflected by the measured object and entered through the objective lens;
a collimation optical system portion for collimating the measured object through the objective lens;
an image processing device configured to obtain a collimation image through the objective lens;
a memory, which alternately stores the image obtained by the image processing device; and
a determination device configured to compare the alternately stored images, wherein
the determination device determines whether or not a moving obstacle has passed a projection optical path of the ranging light during the irradiation of the ranging light based on a compared image, eliminates a ranging result of the ranging portion when it is determined that the moving obstacle cuts across the projection optical path, and outputs a re-ranging command toward the ranging portion such that the ranging portion performs re-ranging, when the ranging data is eliminated.

2. The surveying apparatus according to claim 1, wherein the determination device conducts a warning when it is determined that the moving obstacle cuts across the projection optical path.

3. A surveying apparatus,
comprising:
an irradiation portion provided with an objective lens, and for irradiating a ranging light toward a measured object;
a ranging portion for measuring a distance more than once per unit time based on a reflection light reflected by the measured object and entered through the objective lens, so as to obtain ranging data;
a collimation optical system portion for collimating the measured object through the objective lens, the collimation optical system portion being provided with an image processing device configured to obtain an image frame per unit time; and a determination device configured to determine whether or not a moving obstacle has passed a projection optical path of the ranging light during the irradiation of the ranging light based on the image frame obtained by the image processing device, wherein the image frame per unit time, and the ranging data per unit time are related, and when it is determined that the moving obstacle cuts across the projection optical path, the determination device outputs a command for eliminating a ranging result to the ranging portion, so as to eliminate only the ranging result corresponding to the image-frame containing the moving obstacle within the image frame obtained by the image processing device.

4. The surveying apparatus according to claim 3, wherein the ranging portion additionally measures ranging data for the number of eliminated ranging result.

* * * * *